US011087169B2

(12) United States Patent
Uchiyama et al.

(10) Patent No.: US 11,087,169 B2
(45) Date of Patent: Aug. 10, 2021

(54) IMAGE PROCESSING APPARATUS THAT IDENTIFIES OBJECT AND METHOD THEREFOR

(71) Applicant: CANON KABUSHIKI KAISHA, Tokyo (JP)

(72) Inventors: Hiroyuki Uchiyama, Macquarie Park (AU); Hiroshi Tojo, Fuchu (JP); Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 16/240,497

(22) Filed: Jan. 4, 2019

(65) Prior Publication Data
US 2019/0220685 A1 Jul. 18, 2019

(30) Foreign Application Priority Data
Jan. 12, 2018 (JP) .............................. JP2018-003815

(51) Int. Cl.
*G06K 9/00* (2006.01)
*G06K 9/46* (2006.01)
(Continued)

(52) U.S. Cl.
CPC ....... *G06K 9/4647* (2013.01); *G06K 9/00362* (2013.01); *G06K 9/00771* (2013.01);
(Continued)

(58) Field of Classification Search
None
See application file for complete search history.

(56) References Cited

U.S. PATENT DOCUMENTS

2007/0237387 A1* 10/2007 Avidan ................. G06K 9/4647
382/159
2009/0290020 A1* 11/2009 McLeish .......... G08B 13/19613
348/143
(Continued)

FOREIGN PATENT DOCUMENTS

JP 2011095921 A * 5/2011
WO WO-2012050185 A1 * 4/2012 ............... G06T 7/11
(Continued)

OTHER PUBLICATIONS

Human Body Postures from Trinocular Camera Images. Iwasawa et al. (Year: 2000).*
(Continued)

*Primary Examiner* — Delomia L Gilliard
(74) *Attorney, Agent, or Firm* — Canon U.S.A., Inc. IP Division

(57) ABSTRACT

An image processing apparatus includes an image feature extraction unit configured to extract an image feature from an input image, a region extraction unit configured to extract a foreground region from the input image based on the image feature, an acquisition unit configured to acquire correction information based on the image feature, a correction unit configured to correct the foreground region using the correction information, an identification feature extraction unit configured to extract a feature for identification from the foreground region corrected by the correction unit, and an identification unit configured to identify an object in the input image based on the feature for the identification.

19 Claims, 16 Drawing Sheets

(51) Int. Cl.
*G06T 7/73* (2017.01)
*G06T 7/60* (2017.01)
*G06K 9/62* (2006.01)

(52) U.S. Cl.
CPC ......... *G06K 9/4628* (2013.01); *G06K 9/6274* (2013.01); *G06T 7/60* (2013.01); *G06T 7/74* (2017.01)

(56) References Cited

U.S. PATENT DOCUMENTS

| | | | | |
|---|---|---|---|---|
| 2012/0045095 | A1* | 2/2012 | Tate | G06T 7/75 382/103 |
| 2012/0288198 | A1* | 11/2012 | Tojo | G06K 9/00771 382/173 |
| 2015/0248751 | A1* | 9/2015 | Ebiyama | G06T 7/248 382/294 |
| 2016/0140399 | A1* | 5/2016 | Yano | G06T 7/593 382/103 |
| 2018/0167535 | A1* | 6/2018 | Widener | H04N 1/6033 |
| 2019/0215410 | A1* | 7/2019 | d'Armancourt | H04N 1/00005 |

FOREIGN PATENT DOCUMENTS

| | | | | |
|---|---|---|---|---|
| WO | WO-2019016879 A1 * | 1/2019 | | G06T 7/00 |
| WO | WO-2019163699 A1 * | 8/2019 | | G06T 7/254 |

OTHER PUBLICATIONS

Slawomir Bak, et al., "Person re-identification employing 3D scene information", Journal of Electronic Imaging, vol. 24, No. 5, 051007, Society of Photo-optical Instrumentation Engineers, INRIA Sophia Antipolis, STARS team, 2004, route des Lucioles, BP93, 06902 Sophia Antipolis Cedex—France, Oct. 23, 2015.

Shengcai Liao, et al., "Person Re-Identification by Local Maximal Occurrence Representation and Metric Learning", Conference on Computer Vision and Pattern Recognition (CVPR), Boston, Jun. 7-12, 2015, pp. 2197-2206.

M. Farenzena, et al., "Person Re-Identification by Symmetry-Driven Accumulation of Local Features", CVPR2010, Published in: 2010 IEEE Computer Society Conference on Computer Vision and Pattern Recognition, Date of Conference: Jun. 13-18, 2010.

Paul Viola, et al., "Robust Real-time Object Detection", IJCV2001, Second International Workshop on Statistical and Computational Theories of Vision—Modeling, Learning, Computing, and Sampling, Vancouver, Canada, Jul. 13, 2001.

* cited by examiner

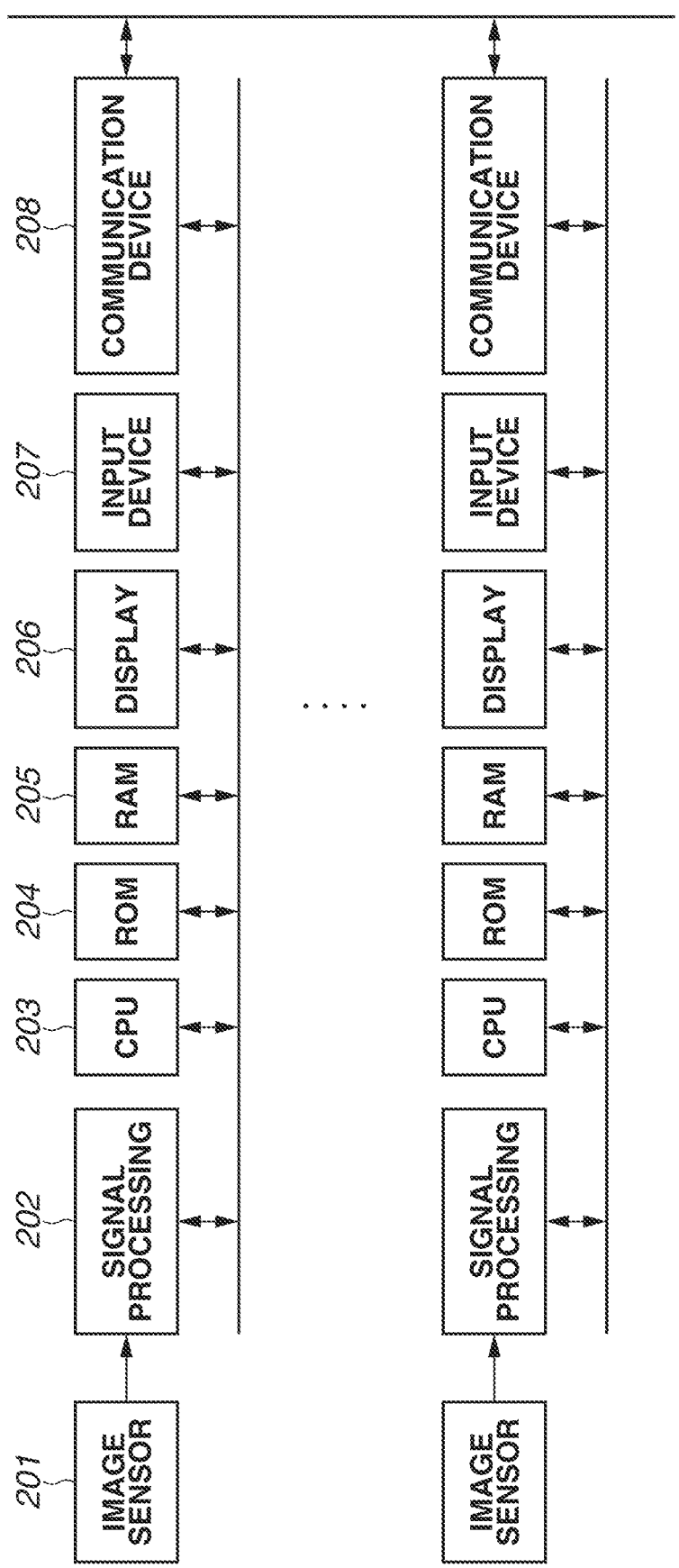

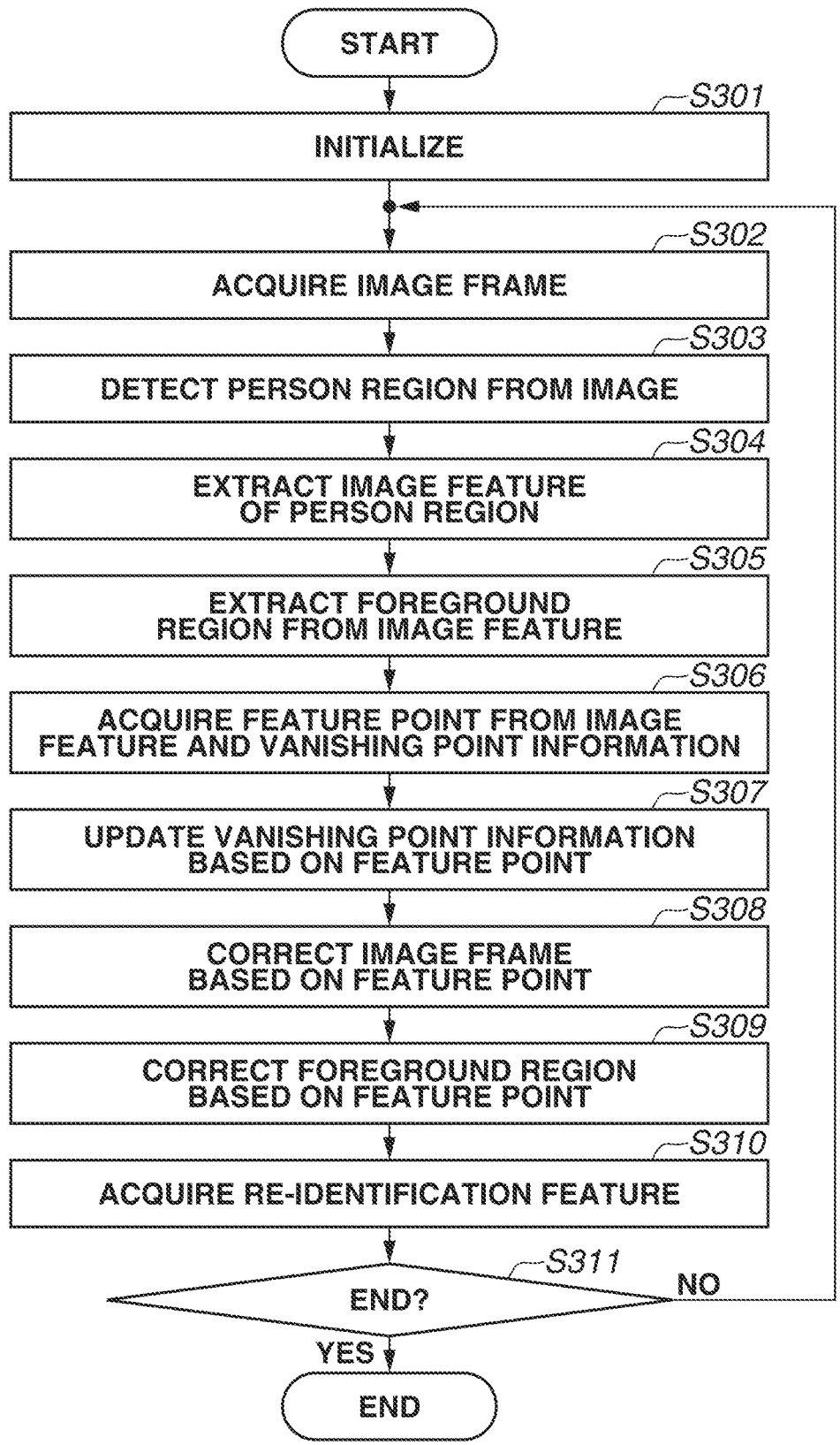

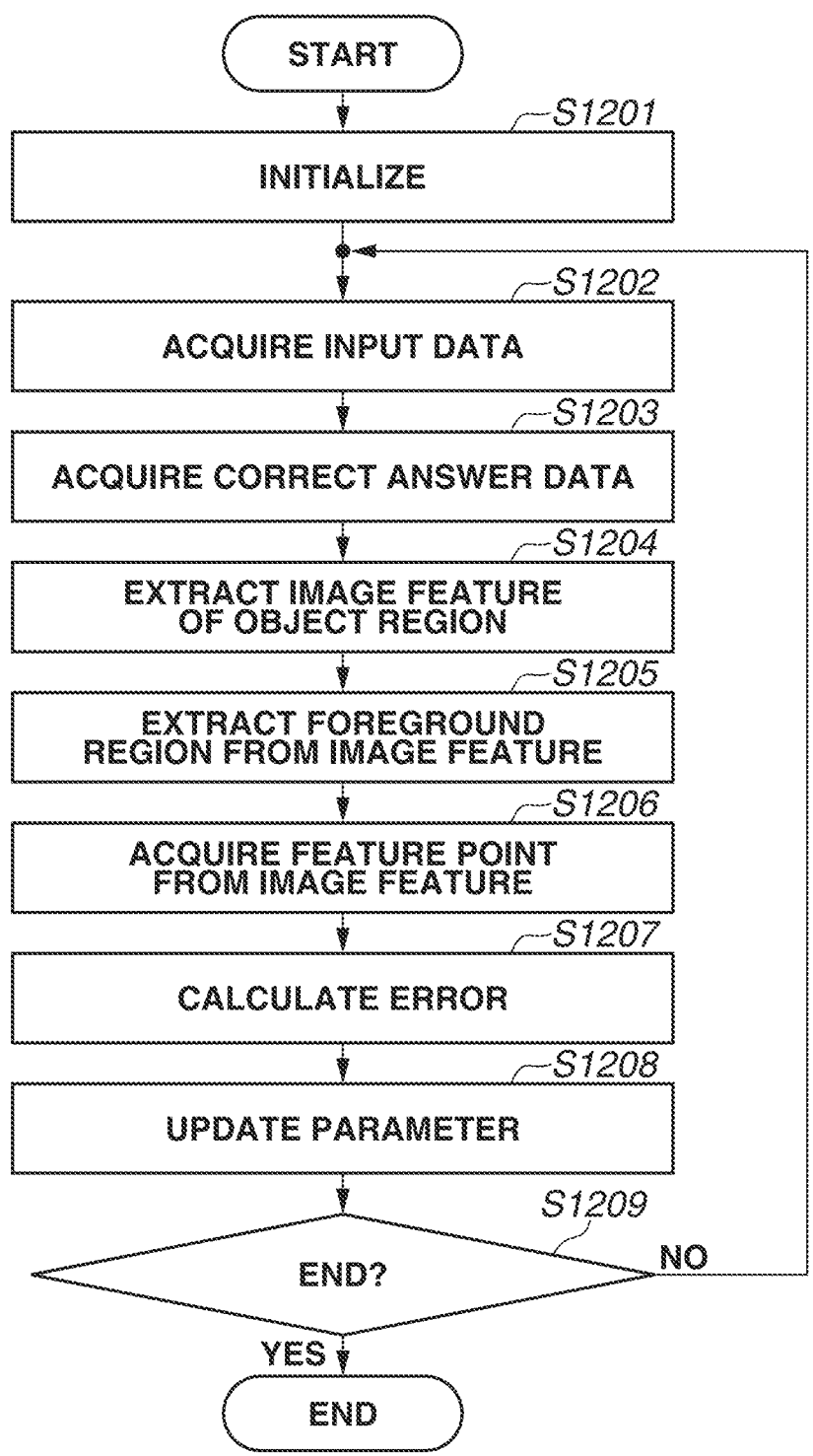

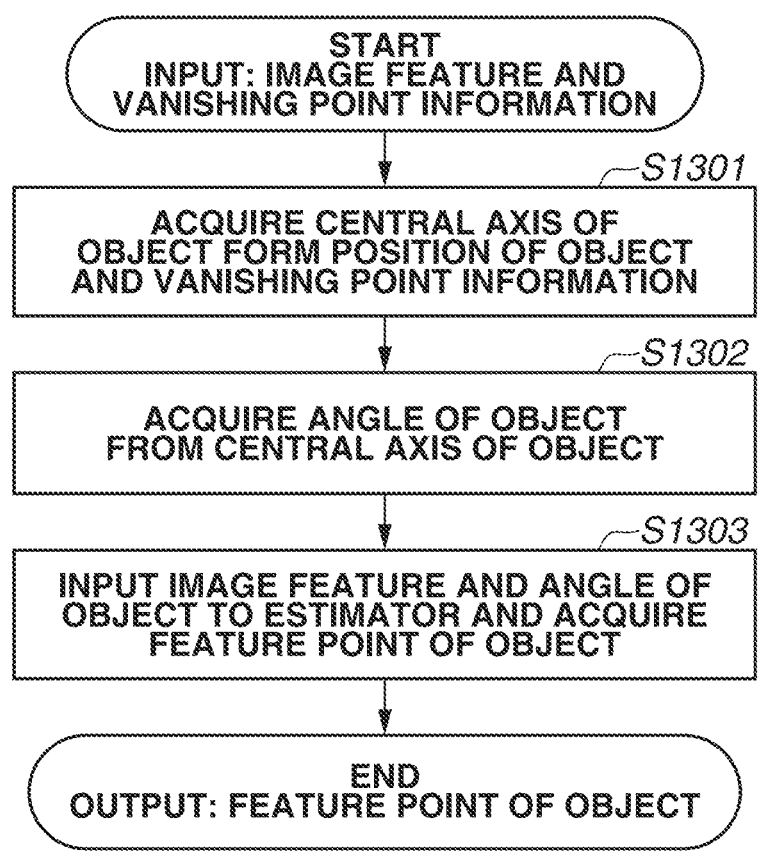

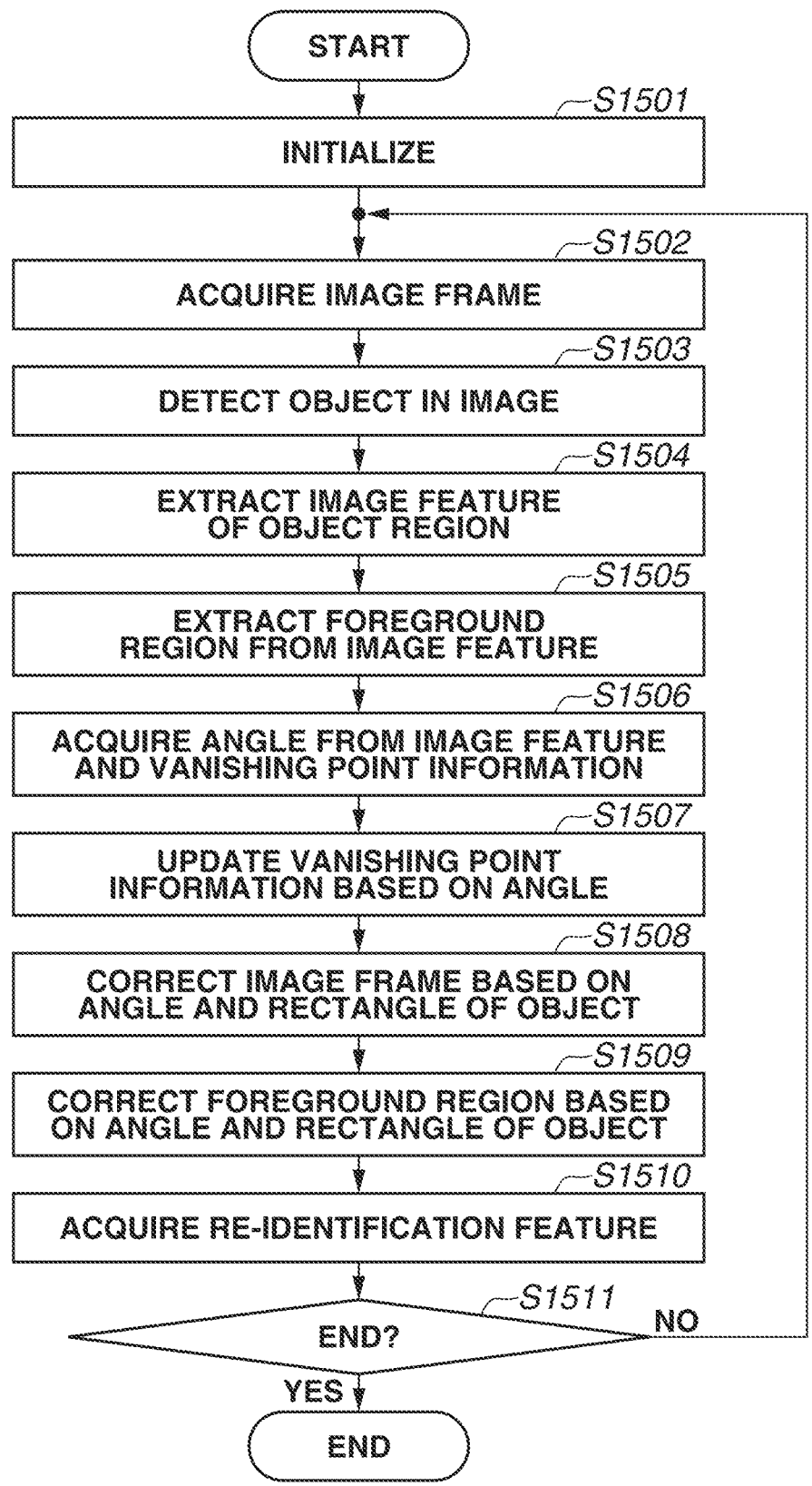

IMAGE PROCESSING APPARATUS THAT IDENTIFIES OBJECT AND METHOD THEREFOR

BACKGROUND OF THE INVENTION

Field of the Invention

The present disclosure relates to an image processing apparatus that identifies an object in an image, and a method therefor.

Description of the Related Art

There is disclosed a technique that, in a monitoring camera system, detects an object such as a person from a camera image and determines whether the object is the same as an object detected by another camera (for example, refer to "Person re-identification employing 3D scene information" written by S. Bak et al. in Journal of Electronic Imaging, Society of Photo-optical Instrumentation Engineers in 2015, and "Person Re-Identification by Local Maximal Occurrence Representation and Metric Learning" written by S. Liao et al. in Proceedings (Proc.) of Institute of Electrical and Electronics Engineers (IEEE) Conference on Computer Vision and Pattern Recognition in 2015). In this technique, first, an object is detected from the camera image. Next, a re-identification feature indicating a feature specific to the object is extracted from a region of the object. Then, the extracted re-identification feature is compared to a re-identification feature of an object detected by a different camera, thereby determining whether these objects are the same object.

Monitoring cameras are often installed at an angle that causes each monitoring camera to look down at an object from above. Therefore, the object is displayed in an image as if being inclined with respect to a y-axis direction of the image as approaching a left/right edge of the image, depending on a perspective of the camera. It is desirable to normalize the object displayed in the image so as to place it under as constant environmental conditions as possible to improve accuracy of the re-identification between the images. Therefore, in the above-described papers written by Bak and the like, an image of the inclined object is corrected into an image in which the object stands upright with use of pre-acquired orientation information such as a rotation of the camera.

Further, the accuracy may decrease if a region other than the object region (a background) is contained in the extraction region from which the re-identification feature is extracted. Therefore, in "Person Re-Identification by Symmetry-Driven Accumulation of Local Features" written by M. Farenzena et al. in Computer Vision and Pattern Recognition (CVPR) in 2010, the re-identification feature is extracted only from the object region using a mask of an estimated object region.

In the above-described paper written by Bak et al., camera calibration is necessary to acquire the orientation information about the camera. However, manual calibration requires labor cost. Especially, when a large number of monitoring cameras are operated, a large burden is placed on a user to set the cameras. The cameras may also have to be set again because of a change in the orientation of the camera due to panning, tilting, or zooming of the camera, or deterioration of a camera fixing tool.

Further, re-identifying the object between the cameras requires both the processing for correcting the inclination of the above-described inclined object by an image transformation and the processing for extracting the object region. However, it is redundant to perform these processing procedures on the same object separately, and this redundancy necessitates an extra calculation amount.

There is a need in the art for providing a technique that enables the object in the image to be easily re-identified.

SUMMARY OF THE INVENTION

According to one aspect of the present disclosure, an image processing apparatus includes an image feature extraction unit configured to extract an image feature from an input image, a region extraction unit configured to extract a foreground region from the input image based on the image feature, an acquisition unit configured to acquire correction information based on the image feature, a correction unit configured to correct the foreground region using the correction information, an identification feature extraction unit configured to extract a feature for identification from the foreground region corrected by the correction unit, and an identification unit configured to identify an object in the input image based on the feature for the identification.

Further features of the present disclosure will become apparent from the following description of exemplary embodiments with reference to the attached drawings.

BRIEF DESCRIPTION OF THE DRAWINGS

FIG. 2 illustrates an example of a hardware configuration of the person re-identification apparatus according to the first exemplary embodiment.

FIG. 3 is a flowchart illustrating a flow of processing by an image analysis unit.

FIG. 12 is a flowchart illustrating a flow of processing by a learning unit.

FIG. 13 is a flowchart illustrating a flow of processing for acquiring the feature point of the object from the image feature and the vanishing point information.

FIG. 15 is a flowchart illustrating a flow of processing by the image analysis unit according to a third exemplary embodiment.

DESCRIPTION OF THE EMBODIMENTS

Figure 1:
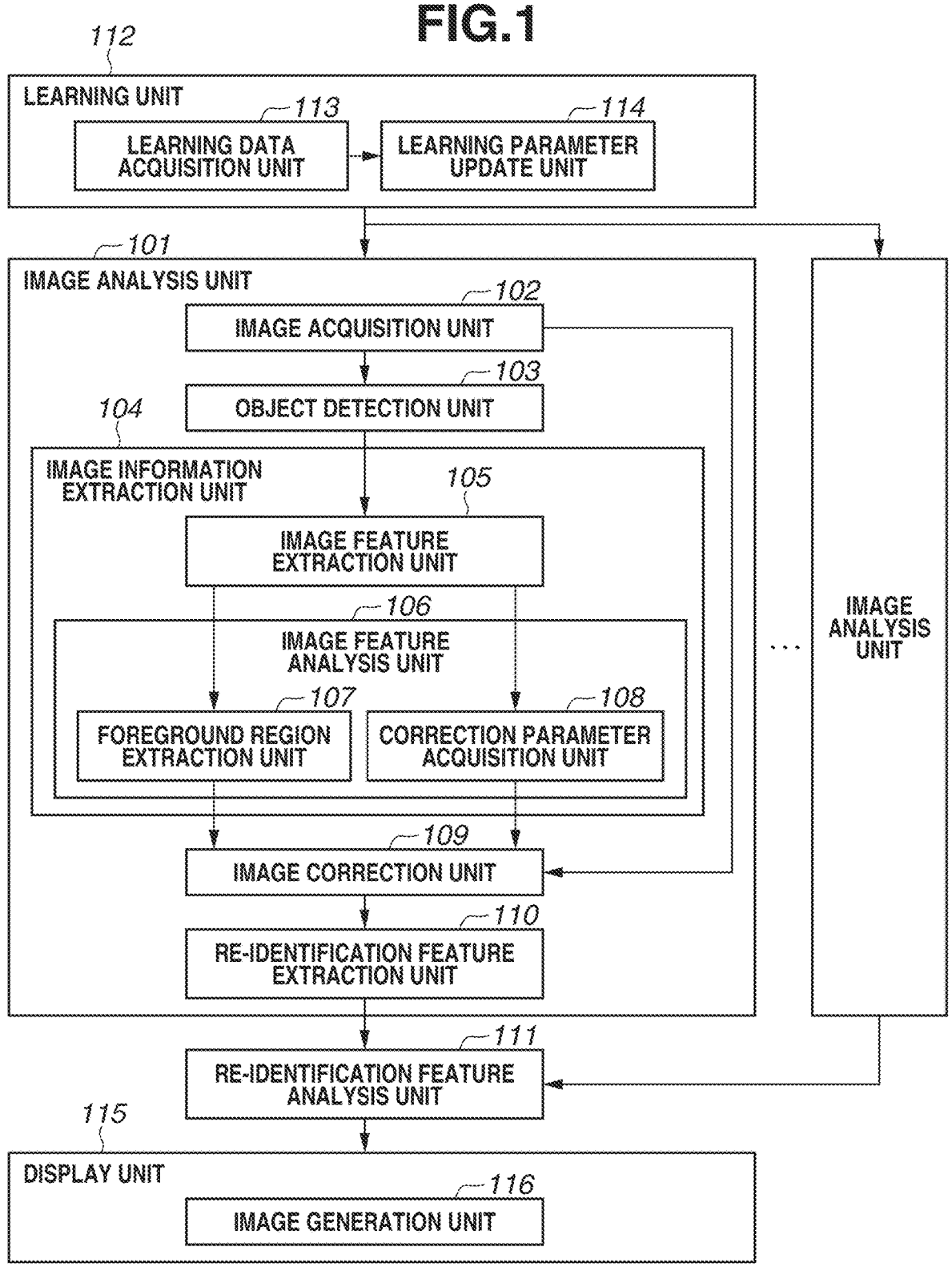
FIG. 1 illustrates a functional configuration of a person re-identification apparatus according to a first exemplary embodiment.

In the following description, exemplary embodiments of the present disclosure will be described in detail with reference to the drawings.

In the following description, a first exemplary embodiment will be described. FIG. 2 illustrates an example of a hardware configuration of a person re-identification apparatus according to the present exemplary embodiment. In FIG. 2, an image sensor 201 includes a charge coupled device (CCD) sensor, a complementary metal-oxide semiconductor (CMOS) sensor, or the like, and converts an optical image of a subject into an electric signal. A signal processing circuit 202 processes a chronological signal regarding the subject image acquired from the image sensor 201 and converts it into a digital signal. A central processing unit (CPU) 203 entirely controls the present apparatus by executing a control program stored in a read only memory (ROM) 204. The ROM 204 stores the control program executed by the CPU 203 and various kinds of parameter data therein. The CPU 203 executes the control program to realize each of processing procedures illustrated in flowcharts that will be described below and causes the apparatus to function.

A random access memory (RAM) 205 stores an image and various kinds of information therein, and functions as a work area of the CPU 203 and an area in which data is temporarily saved. A display 206 displays data thereon. An input device 207 is a pointing device, such as a mouse, or a keyboard, and receives an input from a user. A communication device 208 is a network, a bus, or the like, and communicates data and a control signal with another communication device.

The person re-identification apparatus realizes processing corresponding to each of steps in the flowcharts that will be described below by software with use of the CPU 203 in the present exemplary embodiment, but may be configured to realize a part or the whole of this processing by hardware such as an electronic circuit. Further, the person re-identification apparatus may realize the configurations other than the image sensor 201 and the signal processing circuit 202 with use of a general-purpose personal computer (PC) or with use of a dedicated apparatus. Further, the person re-identification apparatus may realize the configurations by executing software (a program) acquired via a network or various kinds of storage media with use of a processing device (a CPU or a processor) of a personal computer or the like.

The present exemplary embodiment will be described using an example in which a person is an object to be monitored, but is not limited thereto. Another object to be monitored can be an animal, a vehicle, and the like.

FIG. 1 illustrates a configuration of an image processing apparatus that functions as the person re-identification apparatus according to the present exemplary embodiment. The image processing apparatus according to the present exemplary embodiment includes one or more image analysis unit(s) 101, a re-identification feature analysis unit 111, a learning unit 112, and a display unit 115. The image processing apparatus includes as many image analysis units 101 as the number of cameras. Although the image processing apparatus includes two image analysis units 101 in the present exemplary embodiment, the image processing apparatus may include any number of image analysis units 101.

The image analysis unit 101 includes an image acquisition unit 102, an object detection unit 103, an image information extraction unit 104, an image correction unit 109, and a re-identification feature extraction unit 110.

The image acquisition unit 102 acquires an input image from the camera. The object detection unit 103 detects a human body in the input image, and acquires a rectangular region containing the entire human body as a human body region (a person region). The person region is assumed to be the region containing the entire body of the person in the present exemplary embodiment, but may be a region containing a predetermined part of the person's body. The image information extraction unit 104 includes an image feature extraction unit 105 and an image feature analysis unit 106.

The image feature extraction unit 105 extracts an image feature from the person region detected by the object detection unit 103 from the image. The image feature analysis unit 106 includes a foreground region extraction unit 107 and a correction parameter acquisition unit 108, and extracts a geometric correction parameter and a foreground region from the image feature extracted by the image feature extraction unit 105.

The foreground region extraction unit 107 generates a foreground region image from the image feature extracted by the image feature extraction unit 105. The correction parameter acquisition unit 108 extracts a feature point of the person from the image feature extracted by the image feature extraction unit 105. The extracted feature point of the person is used to geometrically correct the image in later processing, and therefore will be referred to as the geometric correction parameter (correction information). The feature point lies at each of the top of the head and the feet of the person in the present example but may lie at another body site as will be described below. If the person's legs are spread, the point at the feet is assumed to be a point between the feet, which lies on an extension of the person's torso.

The image correction unit 109 geometrically corrects the input image acquired by the image acquisition unit 102 with use of the geometric correction parameter acquired by the correction parameter acquisition unit 108. Further, the image correction unit 109 geometrically corrects the foreground region image acquired by the foreground region extraction unit 107 with use of the geometric correction parameter acquired by the correction parameter acquisition unit 108. The image is geometrically corrected by conducting an affine transformation in such a manner that the person stands upright based on the points at the top of the head and the feet of the person. Instead of the affine transformation, however, another transformation method can be employed as will be described below.

The re-identification feature extraction unit 110 extracts (generates) a re-identification feature, which is to be used for re-identification, from the input image and the foreground region image each geometrically corrected by the image correction unit 109. The re-identification feature refers to a feature specific to a person and distinguishes the person from another person, and whether they are the same person is determined by comparing the features to each other.

The re-identification feature analysis unit 111 compares the re-identification feature acquired by the re-identification feature extraction unit 110 and a re-identification feature acquired by the image analysis unit 101 corresponding to a different camera, and determines whether the people corresponding to the respective re-identification features are the same person. Although the image processing apparatus will be described referring to the method in which re-identification features acquired by different cameras are compared to each other by way of example in the present exemplary embodiment, re-identification features acquired from images captured by the same camera at different times can be compared to each other.

The learning unit 112 includes a learning data acquisition unit 113 and a learning parameter update unit 114.

The learning data acquisition unit 113 acquires learning data to learn parameters for controlling the image feature extraction unit 105, the foreground region extraction unit 107, and the correction parameter acquisition unit 108.

The learning parameter update unit 114 updates the parameters for controlling the image feature extraction unit 105, the foreground region extraction unit 107, and the correction parameter acquisition unit 108 with use of the learning data acquired by the learning data acquisition unit 113.

The display unit 115 displays the image of a person on a screen. The display unit 115 includes an image generation unit 116. The image generation unit 116 generates a display image that is the image of the person to be displayed.

In the present exemplary embodiment, the image analysis unit 101, the re-identification feature analysis unit 111, the learning unit 112, and the display unit 115 are constructed on different computers, and are connected via a network. However, the configuration of the image processing apparatus is not limited to this example, and these units may be constructed on the same computer or may be constructed on any number of computers.

The learning unit 112 learns the parameters to be used by the image analysis unit 101 before the image analysis unit 101 operates. The learning unit 112 transfers the learned parameters to the computer on which the image analysis unit 101 is in operation, via the network. Details of the operation of the learning unit 112 will be described below. After the parameters learned by the learning unit 112 is transferred to the image analysis unit 101, the computer of the learning unit 112 is no longer necessary and may be removed from the network or may be left therein. The learning unit 112 is caused to operate at least once before the image analysis unit 101 operates.

The re-identification feature extracted by the image analysis unit 101 is transferred to the computer on which the re-identification feature analysis unit 111 is in operation, via the network. Then, the re-identification feature analysis unit 111 compares the re-identification features to each other and determines whether the people corresponding thereto are the same person.

The operation of the image analysis unit 101 will be described with reference to a flowchart illustrated in FIG. 3. In step S301, the image analysis unit 101 initializes the system. In step S302, the image acquisition unit 102 acquires an input image frame from the camera or a storage device. The processing in step S302 corresponds to the operation of the image acquisition unit 102 illustrated in FIG. 1.

In step S303, the object detection unit 103 detects the rectangular region containing the entire body of the person from the image acquired in step S302. This detection of the person region is carried out with use of a method discussed in "Robust Real-time Object Detection" written by Paul Viola and Michael Jones in International Journal Computer Vision (IJCV) in 2001. The processing in step S303 corresponds to the operation of the object detection unit 103 illustrated in FIG. 1.

Figure 4A:
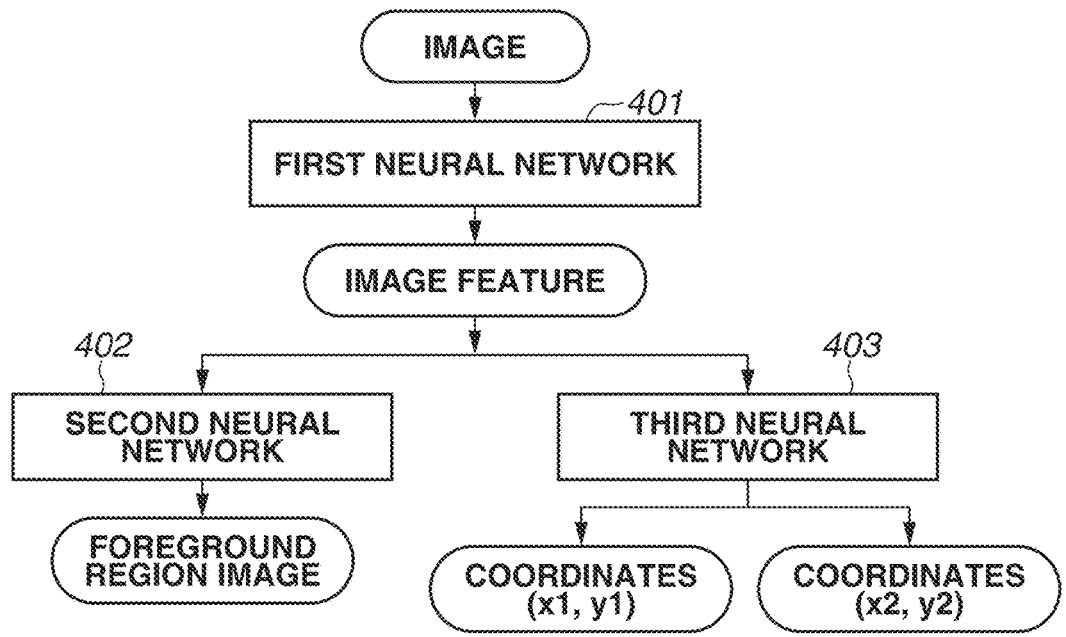
FIGS. 4A, 4B, 4C, and 4D illustrate a neural network according to the first exemplary embodiment.

In steps S304 to S306, the image information extraction unit 104 acquires the foreground region and the feature point of the person from the image of the person region acquired in step S303 with use of a neural network. This neural network includes three partial neural networks: a first neural network, a second neural network, and a third neural network (FIG. 4A). The second neural network and the third neural network each receive an output of the first neural network as an input thereof.

In step S304, the image feature extraction unit 105 extracts the image feature from the person region acquired in step S303. The first neural network is used to extract the image feature. An input to this first neural network is a Red-Green-Blue (RGB) image having a fixed size. Therefore, the image feature extraction unit 105 first enlarges or reduces the image in the rectangular region acquired in step S303, thereby generating a person region image having the fixed size. The RGB image is, in other words, a three-dimensional array having a width, a height, and the number of channels. An image feature expressed by a feature map having a predetermined size is acquired as an output by inputting the person region image to the first neural network.

Figure 4B:
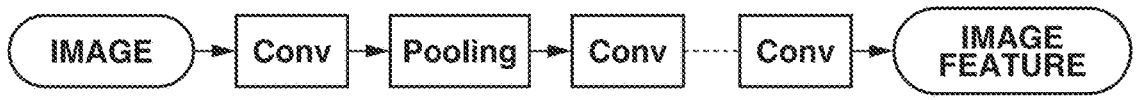

FIG. 4B illustrates an example of a configuration of the first neural network. The first neural network includes multiple convolution layers and a pooling layer, but is not limited thereto and another type of neural network may be used as the first neural network. In the present exemplary embodiment, the first neural network has the convolution layer as the last layer thereof, and therefore this image feature is the three-dimensional array having the width, the height, and the number of channels. The processing in step S304 corresponds to the operation of the image feature extraction unit 105 illustrated in FIG. 1.

Figure 4C:
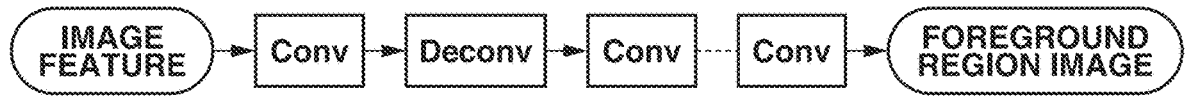

In step S305, the foreground region extraction unit 107 extracts the foreground region image from the image feature extracted in step S304. The foreground region image is a gray-scale image having a predetermined size and expressed by luminance values ranging from 0 to 1, which approach 1 as a foreground likelihood increases and approach 0 as a background likelihood increases. The second neural network is used to extract the foreground region. The foreground region extraction unit 107 acquires the foreground region image as an output by inputting the image feature to the second neural network. FIG. 4C illustrates an example of a configuration of the second neural network. The second neural network includes multiple convolution layers, a pooling layer, and a deconvolution layer, but is not limited thereto and another type of neural network may be used as the second neural network. The processing in step S305 corresponds to the operation of the foreground region extraction unit 107 illustrated in FIG. 1.

In step S306, the correction parameter acquisition unit 108 acquires the position of the feature point of the human body, which serves as the correction parameter, from the image feature extracted in step S304 and vanishing point information. The processing in step S306 corresponds to the operation of the correction parameter acquisition unit 108 illustrated in FIG. 1.

The operation of the image information extraction unit 104 corresponds to a series of operations of the image feature extraction unit 105, the foreground region extraction unit 107, and the correction parameter acquisition unit 108. The operation of the image feature analysis unit 106 corresponds to a series of operations of the foreground region extraction unit 107 and the correction parameter acquisition unit 108.

Figure 4D:
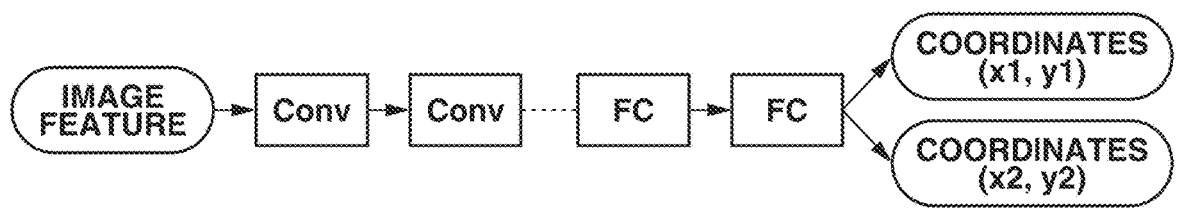

Details of the processing for acquiring the feature point in step S306 will be described with reference to a flowchart illustrated in FIG. 5. In step S501 in FIG. 5, the correction parameter acquisition unit 108 extracts the feature point of the object from the image feature extracted in step S304 in FIG. 3. Specifically, the feature point of the object is the point at each of the top of the person's head and the person's feet. The third neural network is used to extract the feature point of the object. Respective two-dimensional coordinates (x1, y1) and (x2, y2) of the top of the head and the feet are acquired as an output by inputting the image feature to the third neural network. FIG. 4D illustrates an example of a configuration of the third neural network. The third neural network estimates coordinates as continuous values, and therefore includes a fully connected layer (a full connection layer) as the last layer thereof. However, the third neural network is not limited thereto, and another type of neural network may be used as the third neural network. In the present exemplary embodiment, the convolution layer is included in the third neural network as illustrated in FIG. 4D, but does not necessarily have to be included.

The output from the first neural network, and the inputs to the second neural network and the third neural network do not necessarily have to be the three-dimensional arrays. They may be prepared in another form, such as a vector in another dimension such as one dimension and two dimensions, depending on the configuration of the neural network. For example, the first neural network may be configured to include a full connection layer as the last layer thereof and output a one-dimensional vector.

Figure 6A:
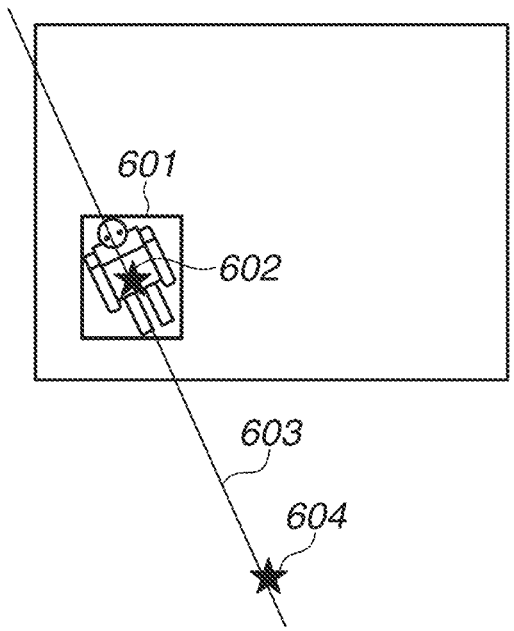
FIGS. 6A and 6B illustrate processing for correcting the feature point of the object.

In step S502, the correction parameter acquisition unit 108 acquires a central axis of the object from a representative point and the vanishing point information of the object detected in step S303 illustrated in FIG. 3. In the present example, the representative point of the object is a center of the rectangular region containing the entire body of the person. Further, the central axis of the object is a straight line expressing a rotational direction and a central line of the object, and indicates a straight line vertically drawn from a specific body site (the center of the body, i.e., the abdomen, in the present exemplary embodiment) toward the feet in the case of a person. FIG. 6A illustrates a schematic view of the processing in step S502. A straight line 603 passing through a representative point 602 and a vanishing point 604 of the object is set as the central axis of the object. In a case where there is no vanishing point information, this step is omitted.

In step S503, the correction parameter acquisition unit 108 corrects the feature point of the object in such a manner that the central axis of the object estimated from the feature point of the object approaches the central axis of the object acquired in step S502. In the case where there is no vanishing point information, this step is omitted. FIG. 6B illustrates a schematic view of the processing in step S503. First, a central axis 606 of the object estimated from the feature point of the object is a straight line passing through a point 607 at the head portion and a point 608 at the feet. Therefore, this straight line can be closer to the central axis 605 of the object acquired in step S502 by moving each of the point 607 at the head portion and the point 608 at the feet in such a manner that they approach the central axis 605 of the object. In the present example, the correction parameter acquisition unit 108 calculates a point at which a perpendicular line drawn from the feature point to the central axis 605 and the central axis 605 intersect each other. Then, the correction parameter acquisition unit 108 calculates a point at which a line between this point and the feature point is internally divided at a constant rate a, and moves the feature point thereto. The correction parameter acquisition unit 108 acquires the feature point of the object corrected based on the vanishing point information as an output of the processing (step S306) according to the flowchart illustrated in FIG. 5.

Figure 7:
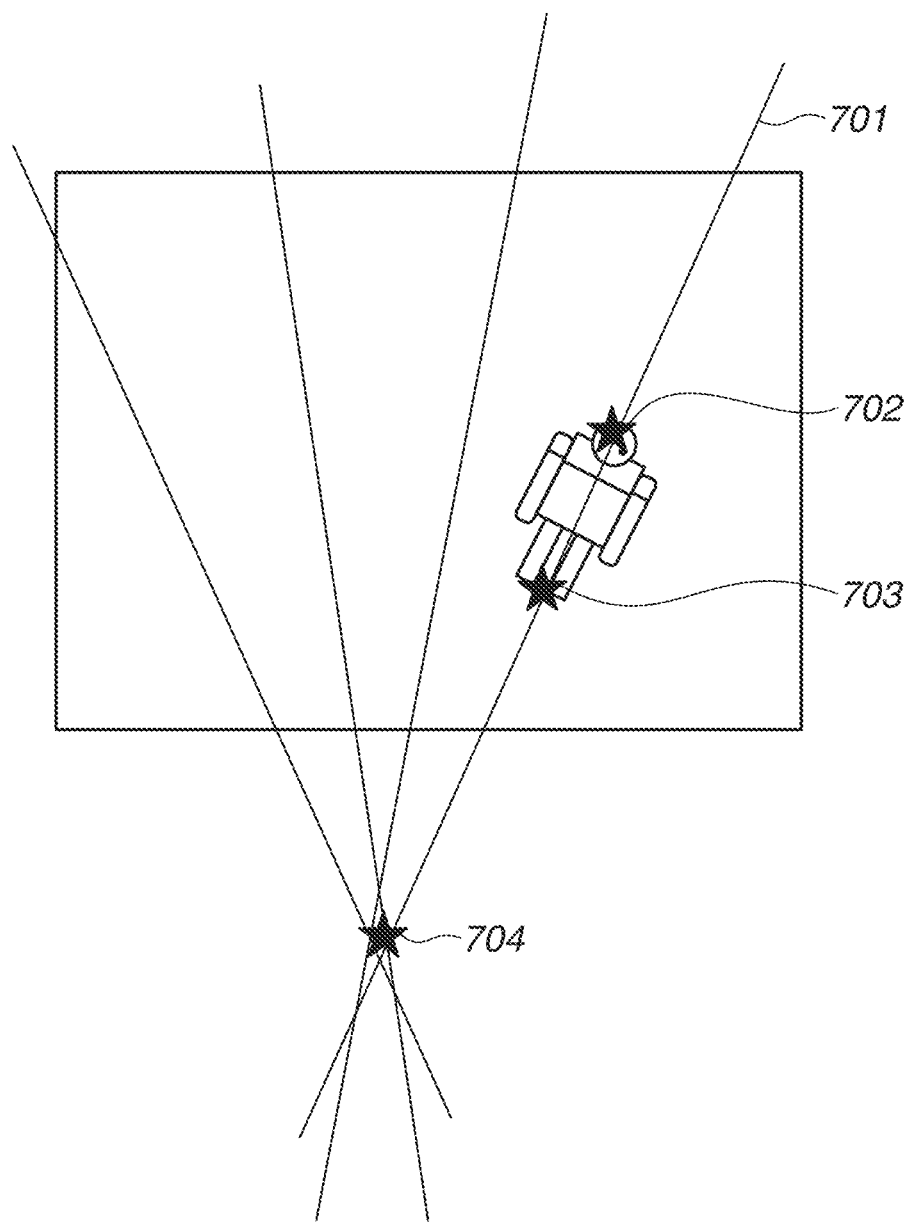
FIG. 7 illustrates processing for updating the vanishing point information with use of the feature point.

In step S307 illustrated in FIG. 3, the image feature analysis unit 106 updates the vanishing point information with use of the corrected feature point acquired in step S306. FIG. 7 schematically illustrates the processing in this step. First, the image feature analysis unit 106 acquires a central axis 701 of the object based on a point 702 at the head portion and a point 703 of the feet of the object by a similar method to that in step S502. Next, the image feature analysis unit 106 estimates a vanishing point 704 by calculating an intersection point of a plurality of central axes of the object. The plurality of central axes of the object is calculated based on the previously stored feature points in frames at the current time and past times, which have been acquired in step S306. However, the central axes may not intersect together at one point due to an error in the estimation of the feature point or distortion of a camera lens when the intersection point of the central axes is calculated. In such a case, the image feature analysis unit 106 calculates a point at which a sum of respective distances from the central axes is minimized, and uses the acquired point as the intersection point.

Figure 8A:
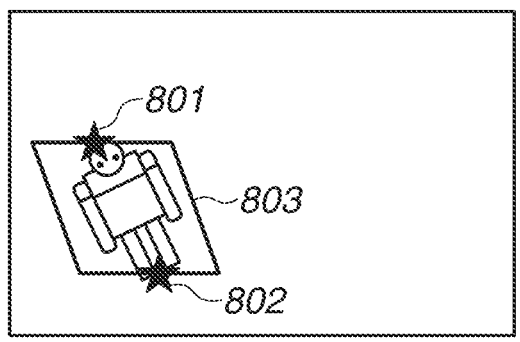
FIGS. 8A, 8B, 8C, and 8D illustrate processing for geometrically correcting an image and a foreground region.
Figure 8B:
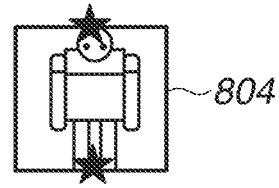

In step S308, the image correction unit 109 geometrically corrects the input image frame acquired in step S302 with use of the feature point acquired in step S306. Further, in step S309, the image correction unit 109 geometrically corrects the foreground region acquired in step S305 with use of the feature point acquired in step S306. The processing in step S308 will be described with reference to FIGS. 8A and 8B. First, as illustrated in FIG. 8A, the image correction unit 109 sets a parallelogram 803 in the image frame based on a point 801 at the head portion and a point 802 at the feet. This parallelogram 803 has horizontal upper and lower sides, and respective midpoints of these upper side and lower side are located at the point of the head portion and the point of the feet. A height of the parallelogram 803 corresponds to a difference between y coordinates of the point 801 at the head portion and the point 802 at the feet, and lengths of the upper side and the lower side are each equal to the height multiplied by a constant value. A slope of the parallelogram 803 is equal to an inclination of a straight line passing through the point 801 at the head portion and the point 802 at the feet. Next, the image correction unit 109 transforms the parallelogram 803 into an image in which the object stands upright and only the object portion is cut out as illustrated in FIG. 8B by applying the geometric transformation of the image to this parallelogram 803.

Figure 8C:
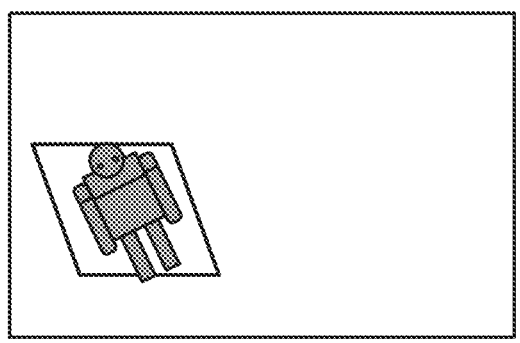
Figure 8D:
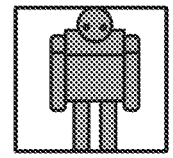

More specifically, the image correction unit 109 applies the affine transformation in such a manner that four vertexes of the parallelogram 803 match four vertexes of a rectangle 804 after the deformation. In the present example, a width and a height of the image illustrated in FIG. 8B have predetermined lengths. Similarly to the processing in step S308, in step S309, the image correction unit 109 also sets a parallelogram in the foreground region image and applies the geometric deformation in such a manner that four vertexes thereof match four vertexes of a rectangle after the transformation as illustrated in FIGS. 8C and 8D. As a result thereof, the image correction unit 109 acquires the foreground region image in which the object stands upright and only the object portion is cut out. The processing in steps S308 and step S309 corresponds to the operation of the image correction unit 109 illustrated in FIG. 1.

Figure 9A:
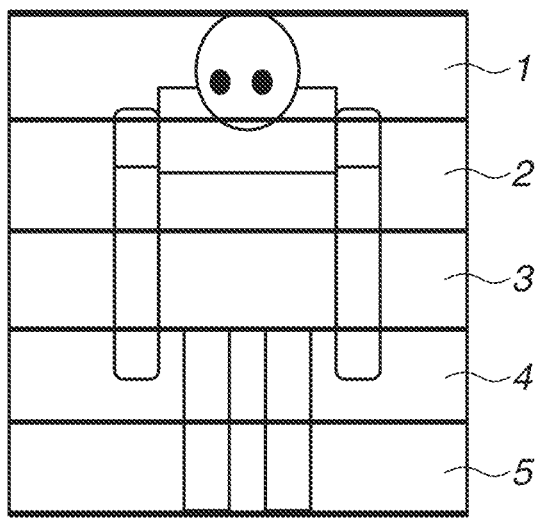
FIGS. 9A and 9B illustrate processing for extracting a re-identification feature from the image and the foreground region.
Figure 9B:
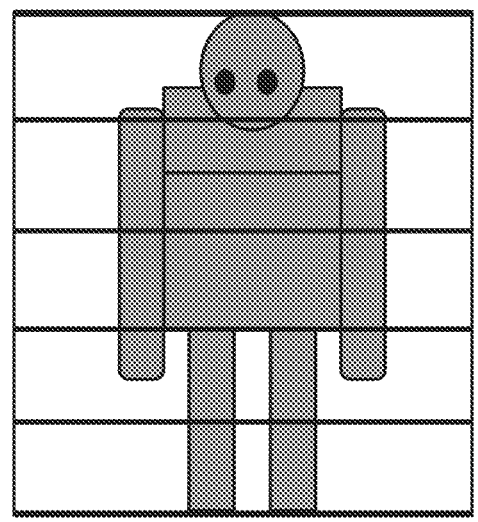

In step S310, the re-identification feature extraction unit 110 extracts the re-identification feature from the geometrically corrected image acquired in step S308 and the geometrically corrected foreground region image acquired in step S309. The processing in step S310 will be described with reference to FIGS. 9A and 9B. First, the re-identification feature extraction unit 110 equally divides the image of the object into N partial regions by drawing borderlines generally horizontally as illustrated in FIG. 9A. Then, the re-identification feature extraction unit 110 calculates a color histogram of the image individually with respect to each of the partial regions defined by dividing the image into the N equal portions. A human body consists of a head, a trunk, and limbs, and a feature of each of them such as a color often varies in the vertical direction due to the colors of clothes, skin, belongings, and/or the like. On the other hand, the color of clothes or the like unlikely exhibits a large change even with a change made to a direction in which the human faces, so that the feature is seldom subject to a large change in the horizontal direction.

Therefore, a personal feature can be expressed well by extracting a feature amount for each of the regions into which the image is vertically divided along the horizontal borders. The re-identification feature extraction unit 110 adds a weight with use of the pixel values in the foreground region illustrated in FIG. 9B in calculation of the color histogram. The luminance values in the foreground region image range from 0 to 1. The foreground likelihood increases as the luminance value is closer to 1 (one), and the background likelihood increases as the luminance value is closer to 0 (zero). Further, to vote into a bin of the color histogram regarding a color pixel at some coordinates in the image, the re-identification feature extraction unit 110 refers to a luminance value at the same coordinates in a background region image and uses this luminance value as a vote weight. The re-identification feature acquired in step S310 is provided to the re-identification feature analysis unit 111. The processing in step S310 corresponds to the operation of the re-identification feature extraction unit 110 illustrated in FIG. 1.

In step S311, the image analysis unit 101 determines whether to end the processing according to the flowchart illustrated in FIG. 3. If an end condition is satisfied (YES in step S311), the processing is ended. If the end condition is not satisfied (NO in step S311), the processing returns to step S302. The image analysis unit 101 determines not to end the processing (NO in step S311) if there is the next image frame, and determines to end the processing (YES in step S311) if there is no next image frame.

Next, the operations of the re-identification feature analysis unit 111 and the display unit 115 illustrated in FIG. 1 will be described with reference to a flowchart illustrated in FIG. 10. FIG. 11 illustrates an example of a screen displayed in the person re-identification according to the present flowchart.

In step S1001, when the user clicks a person on a screen of a camera A, the display unit 115 specifies a person as a search target. The person that can be specified as a search target is the person detected in step S303 illustrated in FIG. 3. The display unit 115 displays the selected person with a rectangle drawn with a solid line and an unselected person with a rectangle drawn with a dotted line on the display screen.

In step S1002, the re-identification feature analysis unit 111 acquires the re-identification feature of the specified person on the camera A. The re-identification feature is the feature extracted by the re-identification feature extraction unit 110. In step S1003, the re-identification feature analysis unit 111 acquires the re-identification feature of an arbitrary person on a camera B.

In step S1004, the re-identification feature analysis unit 111 calculates a degree of difference by re-identifying and comparing the re-identification features respectively acquired in step S1002 and step S1003 to each other, and determines whether the person on the camera B is a candidate for the same person. First, the re-identification feature analysis unit 111 calculates a Euclidean distance between the re-identification features. If the Euclidean distance is equal to or shorter than a threshold value, the re-identification feature analysis unit 111 determines that the person on the camera B is the candidate for the same person (YES in step S1005). Otherwise the re-identification feature analysis unit 111 determines that the person on the camera B is a different person (NO in step S1005). In the present exemplary embodiment, the distance is compared based on the Euclidean distance, but may be compared based on another distance index such as an L1 distance or may be calculated by mapping the person in another space such as a partial space.

If the person on the camera B is determined to be the candidate for the same person from the re-identification in step S1004 in step S1005 (YES in step S1005), the processing proceeds to step S1006. If the person on the camera B is determined to be a different person from the re-identification in step S1004 in step S1005 (NO in step S1005), the processing proceeds to step S1007. In step S1006, the re-identification feature analysis unit 111 adds the person on the camera B that has been determined to be the candidate for the same person in step S1005 to a list of candidates for the same person together with the degree of difference. If the re-identification feature analysis unit 111 has completed the re-identification between the selected person on the camera A and all people on the camera B in step S1007 (YES in step S1007), the processing proceeds to step S1008. If the re-identification feature analysis unit 111 has not completed the re-identification of all the people on the camera B (NO in step S1007), the processing returns to step S1003.

In step S1008, the image generation unit 116 generates a person image to be displayed on the screen in subsequent steps with respect to each of the person on the camera A that has been selected in step S1001 and the people added to the list of candidates for the same person in step S1006. More specifically, the re-identification feature analysis unit 111 generates a person image with a background image edited based on the person image geometrically corrected in step S308 and the foreground region image geometrically corrected in step S309 illustrated in FIG. 3. In the present example, the re-identification feature analysis unit 111 refers to the pixels in the geometrically corrected foreground region image, and sets the pixels in the background region not corresponding to the foreground region in the person image to pixels of an arbitrary color (black in the present exemplary embodiment).

In other words, the re-identification feature analysis unit 111 sets a predetermined color to color information about the pixels in the background portion in the image by referring to the foreground region. The background portion is painted out with the pixels of the arbitrary color in the present exemplary embodiment, but may be edited by another method, such as setting a region other than the foreground transparently or translucently. More specifically, the re-identification feature analysis unit 111 sets predetermined transparency to transparency information about the pixels in the background portion in the image by referring to the foreground region. Alternatively, the background portion may be replaced with, for example, a photograph, or an arbitrary image such as a pattern such as a checkered pattern (a checkerboard). In sum, the re-identification feature analysis unit 111 sets a predetermined image to the color information or the transparency information about the pixels in the background portion in the image by referring to the foreground region. Alternatively, the background region may be edited by a combination of a plurality of methods, such as combining an arbitrary image and a translucent background. The processing in step S1008 corresponds to the processing of the image generation unit 116 illustrated in FIG. 1.

In step S1009, the display unit 115 displays the person on the camera A that has been selected in step S1001 and the people in the list of candidates for the same person that have been added in step S1006 on the screen. As illustrated in FIG. 11, the display unit 115 displays the person on the camera A as a query image on the screen. Further, the display unit 115 displays the plurality of people in the list of candidates for the same person, as the candidates for the same person. The plurality of people in the list is horizontally arranged side by side below the query image on the screen, as candidate images. At this time, the display unit 115 displays the people so that they are arranged in ascending order of the degree of difference determined in step S1004. This display leads to an effect of making it easy for the user to visually look for the same person due to the rearrangement. Further, the display unit 115 displays a "select" button to be used in the next step below each of the candidate images, and displays a predetermine number of people that is one or more in a maximized manner.

In step S1010, the display unit 115 receives a user operation for selecting the person that the user thinks is most likely the same person from the candidates for the same person that have been displayed in step S1009. The display unit 115 stores information about each of this selected person on the camera B and the person on the camera A which has been selected in step S1001 into the storage device as the same person. The image processing apparatus may be configured to provide a button "all people are different" on the screen to allow the user to input that the same person is not contained in the displayed candidates for the same person at this time.

Figure 10:
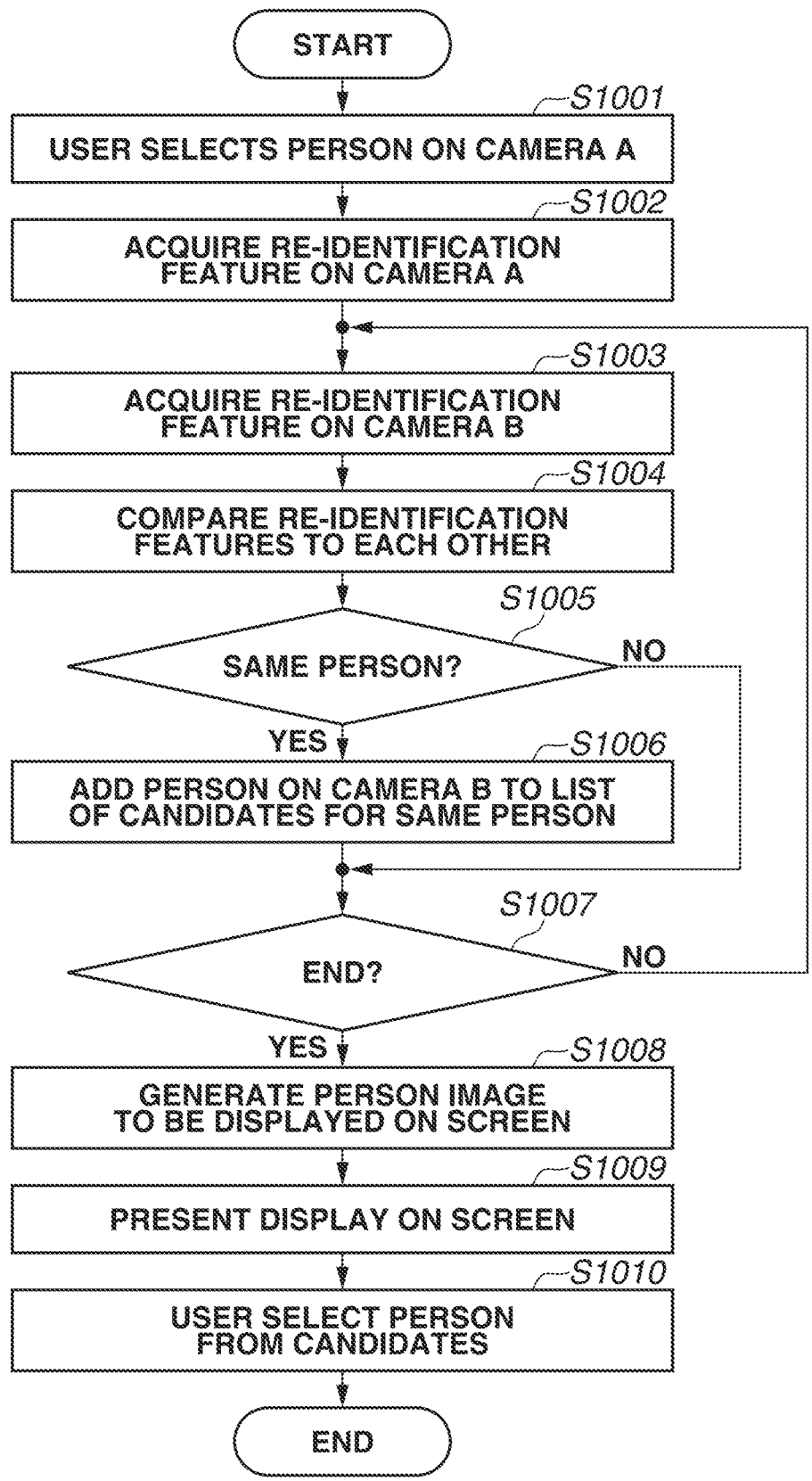
FIG. 10 is a flowchart illustrating a flow of processing by a re-identification feature analysis unit.
Figure 11:
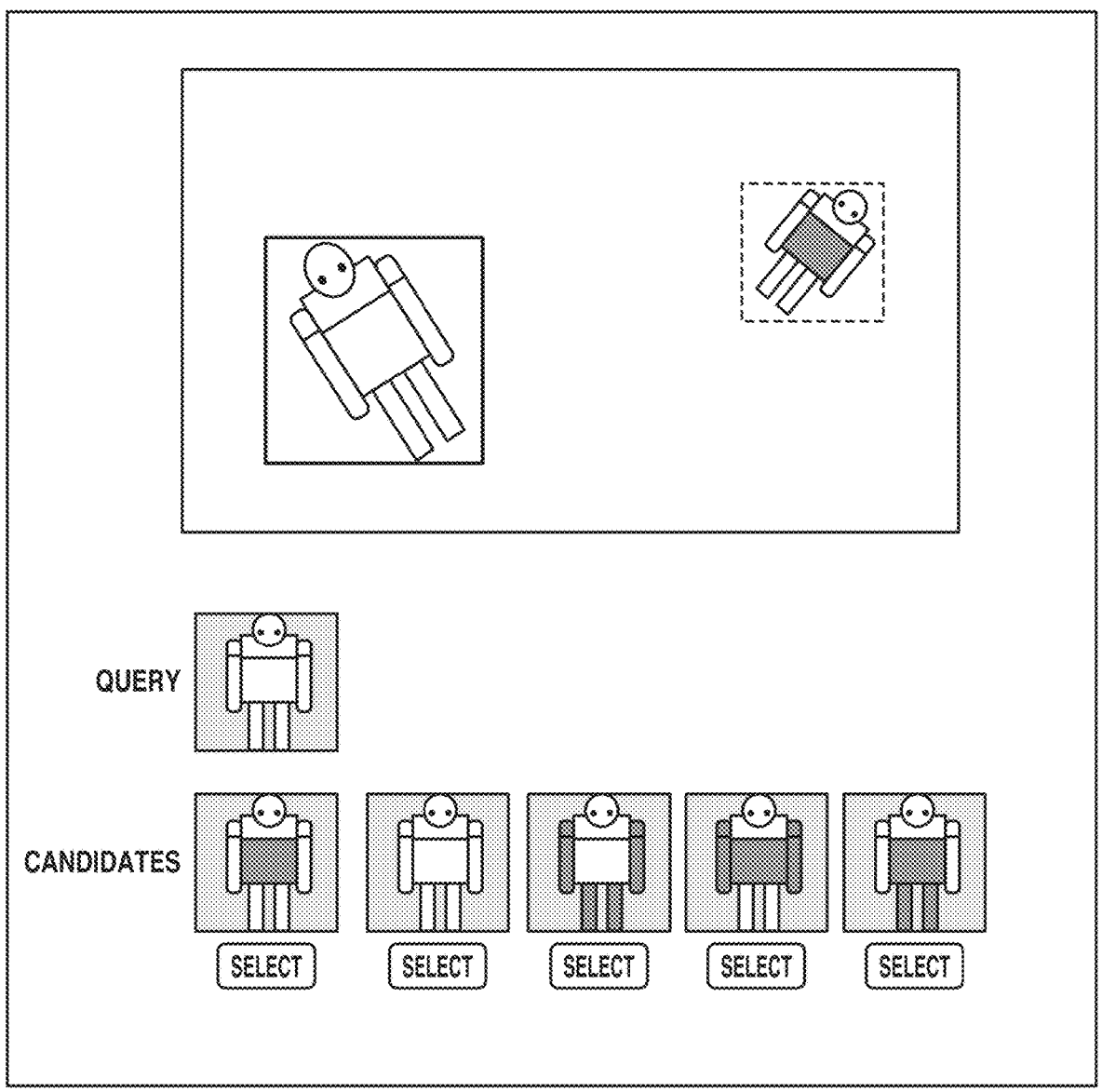
FIG. 11 illustrates an example of a screen display.

In FIG. 10, the processing from step S1002 to step S1007 corresponds to the operation of the re-identification feature analysis unit 111, and the processing in the other steps corresponds to the operation of the display unit 115.

The operation of the learning unit 112 illustrated in FIG. 1 will be described with reference to a flowchart illustrated in FIG. 12. In the present flowchart, the learning unit 112 causes the neutral work to learn by the backward propagation of errors (backpropagation) method using an object image and correct answer data manually collected in advance.

In step S1201, the learning unit 112 initializes the neural network. More specifically, the learning unit 112 initializes a connection weight of each of the layers forming the first neural network, the second neural network, and the third neural network with a random number. In step S1202, the learning unit 112 acquires input data, i.e., the object image from the storage device. The object image is the data manually collected in advance.

In step S1203, the learning unit 112 acquires the correct answer data for the output of the neural network from the storage device. In other words, the learning unit 112 acquires the foreground region image and the respective coordinates (x1, y1) and (x2, y2) of the point at the head portion and the point at the feet. The correct answer is the data manually collected in advance.

In step S1204, the learning unit 112 inputs the object image acquired in step S1202 to the first neural network and extracts the image feature. At this time, the learning unit 112 stores, into the storage device, an output value of each of the layers when the data passes through each of the layers in the first neural network.

In step S1205, the learning unit 112 inputs the image feature acquired in step S1204 to the second neural network and extracts the foreground region. At this time, the learning unit 112 stores, into the storage device, an output value of each of the layers when the data passes through each of the layers in the second neural network.

In step S1206, the learning unit 112 inputs the image feature acquired in step S1204 to the third neural network and acquires the feature point of the object. At this time, the learning unit 112 stores, into the storage device, an output value of each of the layers when the data passes through each of the layers in the third neural network.

In step S1207, the learning unit 112 compares the foreground region acquired in step S1205 and the feature point of the object acquired in step S1206, and the correct answer data acquired in step S1203, and calculates an error function E (a loss function) with use of the following equation.

$$E=\alpha E_1+(1-\alpha)E_2$$

In this equation, $\alpha$ is a constant value in a range from 0 to 1. $E_1$ represents a degree of difference (a squared error) between the foreground region acquired in step S1205 and the foreground region in the correct answer data, and $E_2$ represents a degree of difference (a squared error) between the feature point of the object acquired in step S1206 and the position of the feature point of the object in the correct answer data. The error function E is a linear sum of $E_1$ and $E_2$.

In step S1208, the learning unit 112 uses the error function E acquired in step S1207. The learning unit 112 updates the connection weight (a learning parameter) of each of the first neural network, the second neural network, and the third neural network to reduce the error function E using the backpropagation method. First, the learning unit 112 updates the second neural network and the third neural network with use of the error function E. Then, the learning unit 112 back-propagates the error through the first neural network and updates the first neural network. At the time of the update by the backpropagation, the learning unit 112 uses the output value of each of the layers when the data passes through each of the layers in the neural networks, which has been stored in step S1204, step S1205, and step S1206.

In step S1209, the learning unit 112 determines whether to end the processing according to the flowchart illustrated in FIG. 12. If an end condition is satisfied (YES in step S1209), the processing is ended. If the end condition is not satisfied (NO in step S1209), the processing returns to step S1202. The learning unit 112 determines not to end the processing (NO in step S1209) if repetition does not reach a predetermined number of times, and determines to end the processing (YES in step S1209) if the repetition reaches the predetermined number of times.

The parameter leaned by the learning unit 112 is transferred to the computer on which the image analysis unit 101 is in operation, via the network.

The color histogram of RGB is used as the re-identification feature in step S310, but a re-identification feature that can be used is not limited thereto and other feature amounts can be used. For example, another color space such as Hue, Saturation, and Value (HSV) may be used. Alternatively, the re-identification feature may be a shape feature, such as the histogram of oriented gradients (HOG) feature and the local binary pattern (LBP) feature, or a combination of a plurality of feature amounts. The re-identification feature may be extracted according to the neural network.

In step S308 and step S309, the image correction unit 109 geometrically corrects the image and the foreground region by such an affine transformation that the parallelogram having the horizontal upper side and lower side is converted into the rectangle. Further, in step S310, the re-identification feature extraction unit 110 horizontally draws the borderlines on the image of the object to equally divide the image of the object into the N partial regions, and extracts the color histogram for each of the partial regions. The affine transformation in step S308 and step S309 has such a property that a horizontal component is preserved. On the other hand, in step S310, the feature amount is extracted along the horizontal region. Therefore, conducting the affine transformation by such a method can be expected to lead to an effect of suppressing deterioration of the feature even after the image is transformed, thereby enabling the feature amount to be excellently extracted.

The geometric corrections of the image and the foreground region are achieved by the affine transformation in the present exemplary embodiment, but may be achieved with use of another method. For example, the geometric correction may be achieved by carrying out a rotational transformation in such a manner that the straight line passing through the points at the person's head and feet extends vertically. The rotational transformation is not the transformation that allows the horizontal component to be preserved, but the influence thereof can be satisfactorily ignored if a rotational angle is small. Further, the rotational transformation does not result in unnatural distortion of the image, and therefore can be expected to lead to an effect of maintaining a natural appearance of the image after the transformation. Especially when the user visually determines whether the persons are the same person, this effect is highly advantageous.

The correction parameter acquisition unit 108 extracts the points at the person's head and feet as the feature point of the object in step S306 illustrated in FIG. 3, but may extract another point. The extracted point may be a point at, for example, a joint such as a shoulder joint, an elbow joint, and a knee joint, a specific body site such as an eye, a nose, a mouth, an ear, and a finger of a hand, or a combination thereof. For example, in a case where both shoulders and the top of the head are used as the feature point, the image correction unit 109 can yield the intended result by carrying out an image transformation such as the affine transformation and the rotational transformation in such a manner that both the shoulders are aligned horizontally and a line connecting a midpoint between both the shoulders and the top of the head extend vertically. Further, the feature point does not necessarily have to be located on the object, and may be a point located outside the object as long as this point has a specific relative positional relationship with the specific site of the object. Further, the feature point may be, for example, a midpoint between the shoulder and the top of the head, or may be a point between the feet, which lies on the extension of the torso, if the legs are spread.

In the present exemplary embodiment, the image correction unit 109 geometrically corrects the image and the foreground region by the affine transformation, but may employ a projection transformation. The points at the head and the feet are extracted as the feature point of the object in step S306 illustrated in FIG. 3, but the projection transformation can be carried out by using four or more points. For example, the image correction unit 109 can carry out the projection transformation in such a manner that the points at the top of the head, the feet, the left shoulder, and the right shoulder in the image before the geometric correction correspond to points at specific positions in the image after the geometric correction. The projection transformation of a two-dimensional image is equivalent to a transformation that projects some three-dimensional plane into another three-dimensional plane. Therefore, this transformation can allow the position of the body site of the person to be further accurately normalized in the image after the geometric correction, thereby being expected to lead to an effect of improving the re-identification accuracy. The feature point is not limited to the top of the head, the feet, the left shoulder, and the right shoulder, and may be another body site. The affine transformation, the rotational transformation, and the projection transformation will be collectively referred to as a geometric transformation.

In the present exemplary embodiment, the foreground region extraction unit 107 and the correction parameter acquisition unit 108 generate the foreground region and the geometric correction parameter, respectively, from the common image feature generated by the image feature extraction unit 105. The use of the common image feature can save redundant processing, thereby being expected to lead to an effect of reducing the calculation amount.

Further, the foreground region extraction unit 107, the correction parameter acquisition unit 108, and the image feature extraction unit 105 are subjected to simultaneous learning by the learning unit 112 in such a manner that the common error function gradually reduces. Therefore, the present configuration can be expected to bring about such an effect that the image feature extraction unit 105 is subjected to desirable learning for the estimation processing procedures of both the foreground region extraction unit 107 and the correction parameter acquisition unit 108 at the subsequent stages.

Further, both the extraction of the foreground and the extraction of the feature point of the object are processing procedures related to extraction of shape information about the object. The simultaneous learning can be expected to produce an effect of allowing pieces of information to be effectively used in a reciprocal manner between different kinds of processing, so that the information about the foreground region can be used to extract the feature amount of the object, and the information about the feature point of the object can be used to extract the foreground region. Therefore, the provision of the common image feature extraction unit 105 subjected to the simultaneous learning can be expected to lead to an effect of improving accuracy of the outputs of the foreground region extraction unit 107 and the correction parameter acquisition unit 108. Especially, a human body has a vertically elongated characteristic shape, and therefore the present configuration is highly effective therefor. This is because the detection of the person region facilitates the identification of the positions of the head and the feet, and the detection of the positions of the head and feet facilitates the identification of the person region.

In the present exemplary embodiment, the geometric correction parameter for the image is estimated from the image. Therefore, the present exemplary embodiment eliminates the necessity of the manual calibration of the camera, and therefore can be expected to bring about an effect of reducing manual work.

In step S306, the present exemplary embodiment can be expected to bring about an effect that the correction parameter acquisition unit 108 can estimate the feature point of the object even when the vanishing point information is not acquired and further accurately estimate the feature point when the vanishing point information is acquired due to access to the prior angle information.

In the present exemplary embodiment, when the person image is displayed on the screen, the display unit 115 displays the person image geometrically corrected so that the person stands upright. This display can be expected to lead to an effect of facilitating user's visual confirmation and observation of the person because the height directions of the displayed people are the same. Therefore, the present exemplary embodiment can be expected to bring about an effect of making it easy for the user to visually compare the people to determine whether they are the same person.

In the present exemplary embodiment, when the person image is displayed on the screen, the display unit 115 displays the person image after removing the background based the information about the foreground region. Presenting the display in this manner can be expected to lead to an effect of facilitating the user's observation of the person. Therefore, the present exemplary embodiment can be expected to bring about the effect that the user can visually compare the people to determine whether they are the same person with ease.

When the person image is displayed on the screen, each person image is geometrically corrected so that the person stands upright therein and the background is the same among the person images, which making the outside circumstances under which the user observes the person images almost the same. Therefore, the present exemplary embodiment can be expected to bring about an effect of allowing the user to focus on observation of details of the people. Therefore, the present exemplary embodiment can be expected to bring about an effect of making it easy for the user to visually compare the people to determine whether they are the same person.

In the exemplary embodiment, after both the image and the foreground region image are geometrically corrected, the person image to be displayed on the screen is generated therefrom. Alternatively, editing of the image, e.g., removal of the background from the image, may be performed based on the foreground region before the image and the foreground region image are geometrically corrected. The person image to be displayed on the screen may be generated by geometrically correcting the edited image. More specifically, the processing may proceed in an order of the step of acquiring the geometric correction parameter and the foreground region, the step of editing the image by referring to the foreground region, and the step of geometrically correcting the edited image based on the geometric correction parameter. A method for editing the image may be similar to any of the methods described above in the description of the processing of step S1008.

In the present exemplary embodiment, after the image correction unit 109 geometrically corrects both the image and the foreground region image, the re-identification feature extraction unit 110 extracts the re-identification feature of the region that indicates the foreground from each of them. Alternatively, editing of the image, e.g., removal of the background from the image, may be performed based on the foreground region before the image and the foreground region image are geometrically corrected. The image correction unit 109 may geometrically correct the edited image, and the re-identification feature extraction unit 110 may extract the re-identification feature therefrom. In other words, an image editing unit that edits the image by referring to the foreground region is provided to the configuration according to the present exemplary embodiment. Then, the order of the processing procedures in the present exemplary embodiment may be set in the following manner.

That is, the processing may proceed in an order of the step of acquiring the geometric correction parameter and the foreground region, the step of editing the image by referring to the foreground region, the step of geometrically correcting the edited image based on the geometric correction parameter, and the step of extracting the re-identification feature from the geometrically corrected image. A method for editing the image may be similar to any of the methods described above in the description of the processing of step S1008. A method for extracting the re-identification feature may be similar to that in step S310. In particular, if the transparency information is added to the pixels in the image in addition to the color information, the extraction of the re-identification feature can also be achieved by handling the transparency information as the foreground information.

In the present exemplary embodiment, a neural network is used in step S304, step S305, and step S306. For a part or all of the feature extractors and the classifiers forming the neural network, other feature extractors and classifiers may be used. For example, other filter features and regression analyses may be used.

In the first exemplary embodiment, the image analysis unit 101, the re-identification feature analysis unit 111, the learning unit 112, and the display unit 115 are constructed on separate computers, and are connected via the network. However, the configuration of the image processing apparatus is not limited thereto, and the image analysis unit 101, the re-identification feature analysis unit 111, and the learning unit 112 may be constructed on separate computers connected via a network, a bus, or a storage medium, or may be constructed on the same computer. Further, these modules may be implemented by further dividing each of the modules into a plurality of submodules arbitrarily and distributing each of these modules and submodules into an arbitrary plurality of computers.

Such a configuration with use of the plurality of computers can be expected to lead to an effect of distributing the load of the calculation. Further, distributing the load makes it possible to realize edge computing, which performs processing with a computer set at a portion close to a camera input, thereby being expected to lead to an effect of reducing a communication load and improving a reaction speed. Further, the communication load can be reduced by communicating an edited image and the feature amount between the computers instead of communicating an unprocessed camera image.

In the present exemplary embodiment, the geometric correction parameter for the image is estimated from the image. Therefore, the present exemplary embodiment eliminates the necessity of the manual calibration of the camera, and therefore can be expected to bring about an effect of being able to reduce the manual work. The foreground region extraction unit 107 and the correction parameter acquisition unit 108 each generate the foreground region and the geometric correction parameter based on the common image feature generated by the image feature extraction unit 105. The use of the common image feature can save the redundant processing, thereby being expected to lead to the effect of reducing the calculation amount.

In the following description, a second exemplary embodiment will be described. The present exemplary embodiment will be described focusing on only differences from the first exemplary embodiment, and omitting descriptions of a configuration and processing other than that because they are similar to the first exemplary embodiment. The processing in step S1206 is performed as indicated in the flowchart illustrated in FIG. 5 in the first exemplary embodiment but may be replaced with a flowchart illustrated in FIG. 13.

Figure 5:
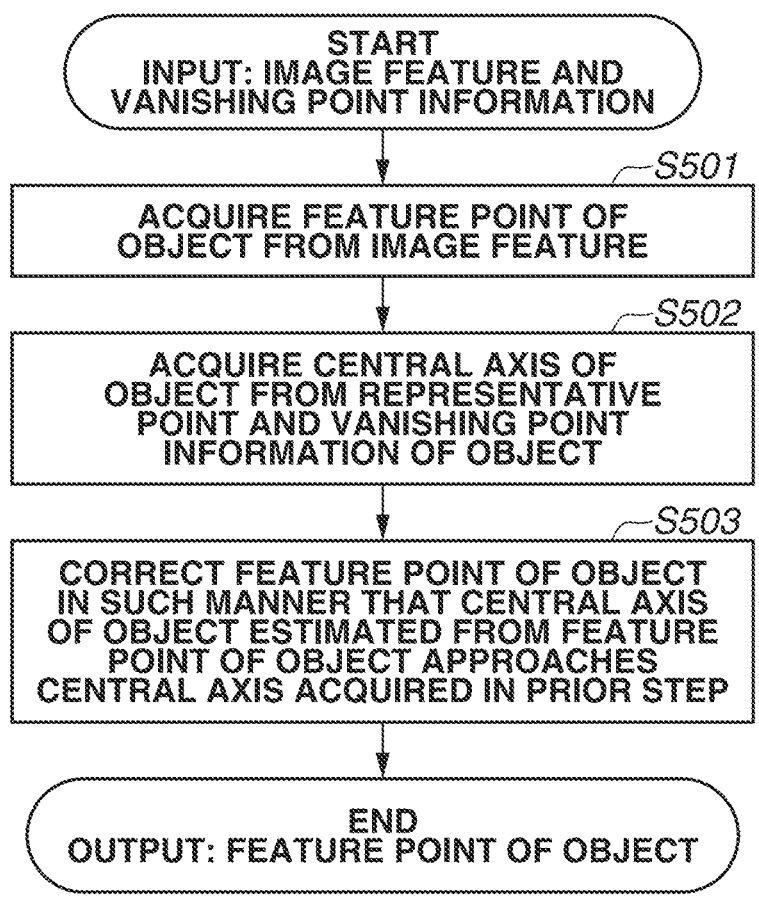
FIG. 5 is a flowchart illustrating a flow of processing for acquiring a feature point of an object from an image feature and vanishing point information.
Figure 6B:
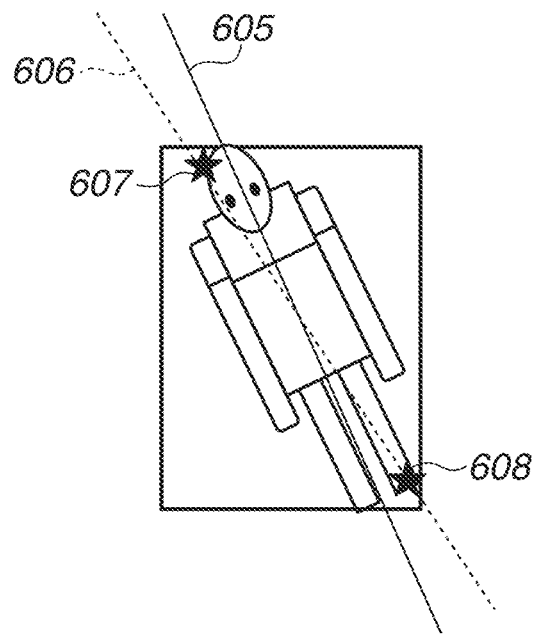

The processing in step S1301 illustrated in FIG. 13 is similar to that in step S502 illustrated in FIG. 5, and the correction parameter acquisition unit 108 acquires the central axis of the object based on the position of the object (the representative point of the object) detected in step S303 illustrated in FIG. 3 and the vanishing point information. The correction parameter acquisition unit 108 does not calculate the central axis when there is no vanishing point information. In step S1302, the correction parameter acquisition unit 108 calculates an angle of the object based on the central axis of the object acquired in step S1301.

In step S1303, the correction parameter acquisition unit 108 extracts the feature point of the object based on the image feature extracted in step S304 illustrated in FIG. 3 and the angle of the object acquired in step S1302 illustrated in FIG. 13. First, the correction parameter acquisition unit 108 expresses the angle of the object by a K-dimensional vector. More specifically, the correction parameter acquisition unit 108 divides 360 degrees into K segments, and sets a value of 1 to an element of a corresponding angle and sets a value of 0 to another element in the K-dimensional vector. If there is no vanishing point information and thus the central axis does not exist in step S1301, the correction parameter acquisition unit 108 evenly inputs a value of 1/K to each element in the K-dimensional vector. This K-dimensional vector indicates prior information about the angle. If the prior information about the angle is unknown, therefore a uniform distribution is created as a probability distribution. Next, the correction parameter acquisition unit 108 acquires each of the two-dimensional coordinates (x1, y1) and (x2, y2) of the top of the person's head and feet as the output by inputting the image feature and the vector indicating the angle to the third neural network.

Figure 14A:
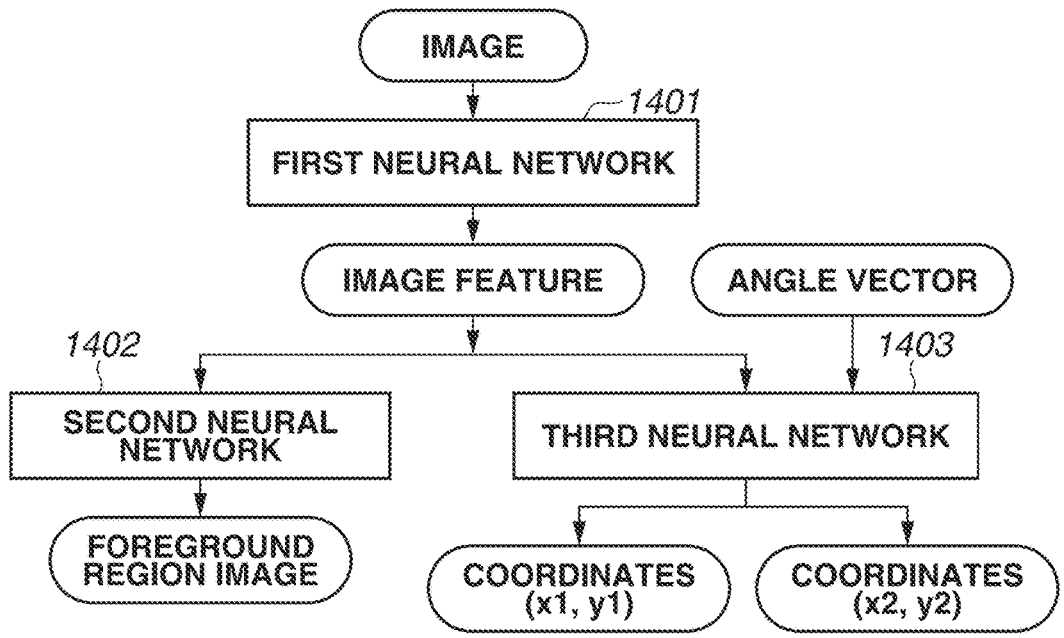
FIGS. 14A, 14B, 14C, and 14D illustrate a neural network according to a second exemplary embodiment.
Figure 14B:
Figure 14C:
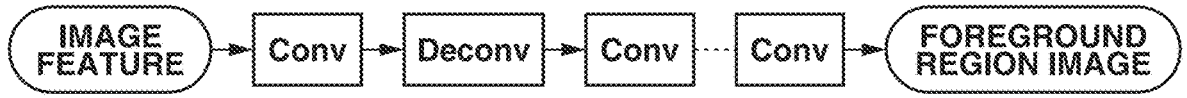
Figure 14D:
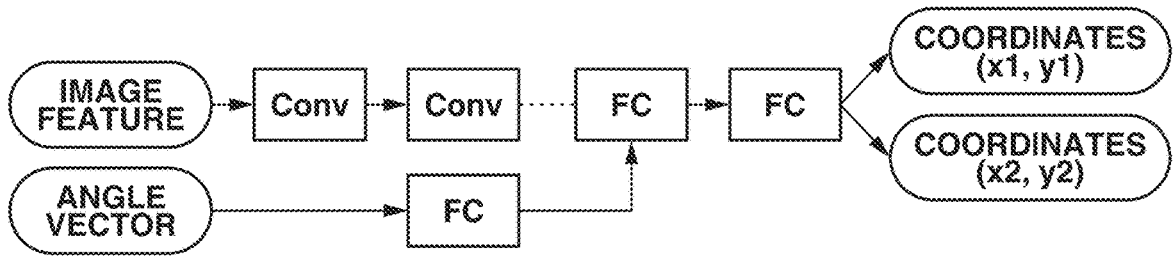

FIG. 14A illustrates a configuration of a neural network used in the present exemplary embodiment. Compared with the neural networks illustrated in FIGS. 4A to 4D according to the first exemplary embodiment, a difference therefrom is that the neural network includes a portion that inputs the vector indicating the angle to the third neural network as illustrated in FIG. 14D. A part of full connection layers forming the third neural network receives both information calculated from the image feature and information calculated from the vector indicating the angle as the input.

The output of this third neural network is adapted by the learning so as to be output in such a manner that the angle of the inclination of the central axis of the object calculated from the output (the two-dimensional coordinates of the top of the head and the legs) can easily approach the angle information indicated by the input (the vector indicated by the angle). The third neural network estimates coordinates as continuous values, and therefore includes a fully connected layer (a full connection layer) as the last layer thereof. However, the third neural network is not limited thereto, and another type of neural network may be used as the third neural network. The feature point of the object corrected based on the vanishing point information is acquired as the output of the processing according to the flowchart illustrated in FIG. 13.

Further, in the first exemplary embodiment, the learning unit 112 acquires the object image from the storage device as the input data in step S1202 illustrated in FIG. 12. In the present exemplary embodiment, since the information regarding the angle of the object is input to the neural network, the learning unit 112 acquires the two kinds of information, i.e., the object image and the object angle information as the input data. The object angle information is not added to all objects, and some object is prepared with the object angle information thereof unknown as indicated in step S1303 illustrated in FIG. 13. Learning samples including both a learning sample of which object angle information is acquired and a learning sample of which object angle information is unknown can be expected to lead to an effect of allowing the neural network to learn so as to desirably identify the object regardless of whether there is the object angle information.

The learning unit 112 is configured to input the angle information to the neural network even with the angle unknown in step S1303 illustrated in FIG. 13. This configuration can be expected to bring about an effect of allowing the neural network to estimate the feature point of the object, thereby allowing the neural network to estimate the inclination of the object, the parameter for geometrically correcting the image, and the vanishing point information even when the vanishing point information is unknown at the time of, for example, a start of the operation of the system. Seeing from another point of view, the present configuration can be expected to bring about an effect of allowing the neural network to further accurately estimate the feature point using the prior angle information when the vanishing point information can be acquired, while the neural network can estimate the feature point of the object even when the vanishing point information is unknown.

In the following description, a third exemplary embodiment will be described. The present exemplary embodiment will be described focusing on only differences from the first exemplary embodiment, and omitting descriptions of a configuration and processing other than that because they are similar to the first exemplary embodiment. In the first exemplary embodiment, the feature point of the object is used as the geometric correction parameter for the image. The angle of the object also can be used as the geometric correction parameter like the present exemplary embodiment. The present exemplary embodiment is different from the first exemplary embodiment in part of the operation of the image analysis unit 101, and is similar to the first exemplary embodiment except for that. An operation of the image analysis unit 101 according to the third exemplary embodiment will be described with reference to a flowchart illustrated in FIG. 15. FIG. 15 is similar to FIG. 3 except for step S1506 and step S1507.

In step S1506, the correction parameter acquisition unit 108 acquires the angle of the object based on the image feature extracted in step S304 and the vanishing point information. First, the third neural network is used to estimate the angle of the object. The angle of the object refers to the inclination angle of the central axis of the object. The correction parameter acquisition unit 108 acquires an angle θ of the object as the output by inputting the image feature to the third neural network. The third neural network includes a full connection layer as the last layer thereof. However, the third neural network is not limited thereto, and another type of neural network may be used as the third neural network. Next, the correction parameter acquisition unit 108 acquires the central axis of the object based on the representative point and the vanishing point information of the object by a similar method to that in step S502 illustrated in FIG. 5. Next, the correction parameter acquisition unit 108 corrects the angle θ of the object estimated by the third neural network so that the angle θ of the object approaches the inclination angle of the central axis of this object. More specifically, the correction parameter acquisition unit 108 corrects the angle θ of the object to an intermediate angle between these two angles.

In step S1507, the image feature analysis unit 106 updates the vanishing point information with use of the angle of the object acquired in step S1506. First, the image feature analysis unit 106 acquires the central axis of the object based on the representative point of the object and the angle of the object determined in step S1506. Then, the image feature analysis unit 106 updates the vanishing point information by determining the intersection point of the central axes of the plurality of objects by a similar method to that in step S307 illustrated in FIG. 3.

In step S1508, the image correction unit 109 geometrically corrects the input image frame acquired in step S1502 with use of the angle of the object acquired in step S1506 and the rectangle of the object acquired in step S1503. Further, in step S1509, the image correction unit 109 geometrically corrects the foreground region acquired in step S1505 with use of the angle of the object acquired in step S1506 and the rectangle of the object acquired in step S1503.

Figure 16A:
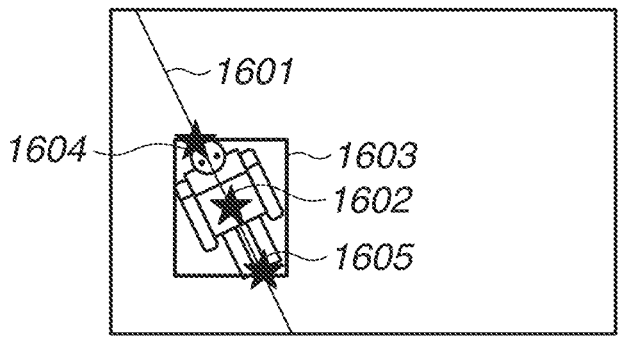
FIGS. 16A, 16B, 16C, and 16D illustrate processing for geometrically correcting the image and the foreground region according to the third exemplary embodiment.
Figure 16B:
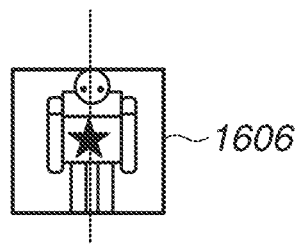
Figure 16C:
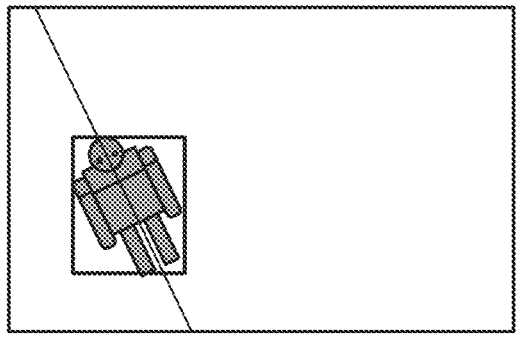
Figure 16D:
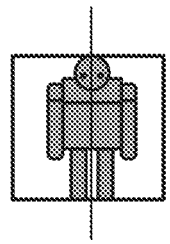

Step S1508 will be described with reference to FIGS. 16A and 16B. First, suppose that a straight line 1601 passes through a representative point 1602 of the object and is inclined at the angle of the object as the central axis of the object. The image correction unit 109 determines two intersection points 1604 and 1605 where this straight line intersects the rectangle of the object. If the object is a person, these intersection points 1604 and 1605 correspond to the points at the top of the person's head and feet, respectively. If the points at the top of the head and the feet, the image correction unit 109 can carry out an image transformation so that the person is displayed standing upright with use of the points at the top of the head and the feet by a similar method to that in step S308 illustrated in FIG. 3 according to the first exemplary embodiment. In step S1509, the image correction unit 109 can also acquire the geometrically corrected foreground region image by carrying out a similar transformation to that in step S1508.

In the present exemplary embodiment, the angle of the object is used as the geometric correction parameter. The angle of the object can be acquired from an outline of the object and is little affected by a local texture, and therefore the use thereof can be expected to lead to an effect of being able to ensure stable acquisition of the geometric correction parameter. For example, an angle of an elongated object such as a human body can be estimated from a silhouette of the object. Therefore, simultaneously estimating the foreground region and the angle of the object is highly effective, and can be expected to lead to an effect of allowing the geometric correction parameter to be acquired with good estimation accuracy.

The angle of the object is used alone as the geometric correction parameter in the present exemplary embodiment, but may be used together with the feature point like the example in the first exemplary embodiment. For example, to acquire the central axis of the object, the image processing apparatus may, for example, use the angle of the object and a centroid of the feature point instead of using the angle of the object and the representative point.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-003815, filed Jan. 12, 2018, which is hereby incorporated by reference herein in its entirety.

What is claimed is:

1. An image processing apparatus comprising:
one or more memories storing instructions; and
one or more processors executing the instructions to:
extract an image feature from an input image;
extract a foreground region from the input image based on the image feature;
acquire, based on the image feature, correction information for applying a geometric transformation to the foreground region;
correct the foreground region using the correction information;
extract a feature for identification from the corrected foreground region; and
identify an object in the input image based on the feature for the identification.

2. The image processing apparatus according to claim 1, wherein an inclination of the foreground region is corrected.

3. The image processing apparatus according to claim 2, wherein the correction information is a correction parameter corresponding to the image feature.

4. The image processing apparatus according to claim 3, wherein the object is a human body.

5. The image processing apparatus according to claim 4, wherein a position of a specific site of the human body is acquired as the correction parameter, and the inclination of the foreground region is corrected based on the position of the specific site.

6. The image processing apparatus according to claim 5, wherein positions of a head portion and feet are acquired as the position of the specific site of the human body.

7. The image processing apparatus according to claim 6, wherein correction is performed so that the positions of the head portion and the feet approach a central axis of the human body.

8. The image processing apparatus according to claim 7, wherein the central axis of the human body is acquired based on a representative point and a vanishing point of the human body.

9. The image processing apparatus according to claim 4, wherein an angle of the human body is acquired as the correction parameter, and the inclination of the foreground region is corrected based on the angle.

10. The image processing apparatus according to claim 1, wherein the input image and the foreground region are corrected, and
wherein, from the corrected input image, the image feature for the identification is extracted from a region that corresponds to the corrected foreground region.

11. The image processing apparatus according to claim 10, wherein the input image is divided into a plurality of regions and a feature amount for each of the divided regions is extracted.

12. The image processing apparatus according to claim 11, wherein the feature amount is weighed for each of the regions based on a pixel value in the foreground region.

13. The image processing apparatus according to claim 1, wherein the one or more processors further comprising executing the instructions to:
generate an image indicating the foreground region is corrected in the input image; and
a display unit configured to display the image generated by the generation unit.

14. The image processing apparatus according to claim 1, wherein at least one of an affine transformation, a rotational transformation, and a projection transformation is carried out.

15. The image processing apparatus according to claim 1, wherein the input image is an image captured by an imaging apparatus, and identifying a person in the input image with a person in an image captured by another imaging apparatus.

16. The image processing apparatus according to claim 1, wherein the input image is an image captured by an imaging apparatus at a certain time, and identifying a person in the input image with a person in an image captured by the imaging apparatus at a different time.

17. The image processing apparatus according to claim 1, wherein the one or more processors further comprising executing the instructions to detect a human body region from the input image,
wherein the image feature is extracted from the human body region.

18. An image processing method comprising:
extracting an image feature from an input image;
extracting a foreground region from the input image based on the image feature;
acquiring, based on the image feature, correction information for applying a geometric transformation to the foreground region;
correcting the foreground region using the correction information;
extracting a feature for identification from the corrected foreground region; and
identifying an object in the input image based on the feature for the identification.

19. A non-transitory computer-readable storage medium storing a program for causing a computer to function as:
an image feature extraction unit configured to extract an image feature from an input image;
a region extraction unit configured to extract a foreground region from the input image based on the image feature;
an acquisition unit configured to acquire, based on the image feature, correction information for applying a geometric transformation to the foreground region;
a correction unit configured to correct the foreground region using the correction information;
an identification feature extraction unit configured to extract a feature for identification from the foreground region corrected by the correction unit; and
an identification unit configured to identify an object in the input image based on the feature for the identification.

* * * * *